United States Patent [19]

Morimoto

[11] Patent Number: 4,548,823

[45] Date of Patent: Oct. 22, 1985

[54] EXTRUSION PROCESS FOR SHRIMP OR CRABMEAT ANALOG PRODUCTS USING BOILING GELLING BATH

[75] Inventor: Keisuke Morimoto, Congers, N.Y.

[73] Assignee: General Foods Corporation, White Plains, N.Y.

[21] Appl. No.: 589,628

[22] Filed: Mar. 15, 1984

[51] Int. Cl.⁴ .......................... A23J 3/00; A23L 1/04
[52] U.S. Cl. .................................. 426/104; 426/276; 426/574; 426/575; 426/656; 426/657; 426/516; 426/802
[58] Field of Search ............... 426/104, 276, 574, 802, 426/575, 656, 657, 516

[56] References Cited

U.S. PATENT DOCUMENTS

| | | | |
|---|---|---|---|
| 3,093,483 | 6/1963 | Ishler et al. .................... | 426/276 X |
| 3,455,697 | 7/1969 | Atkinson ......................... | 426/276 |
| 3,891,776 | 6/1975 | Carpenter et al. ............ | 426/574 X |
| 4,001,441 | 1/1977 | Liepa .............................. | 426/802 X |
| 4,006,256 | 2/1977 | Kyros ............................. | 426/276 X |
| 4,117,172 | 9/1978 | Bradshaw et al. ............. | 426/276 |
| 4,423,083 | 12/1983 | Shenouda ...................... | 426/574 |

FOREIGN PATENT DOCUMENTS 47-24740  7/1972  Japan ................................ 426/574

*Primary Examiner*—Robert Yoncoskie
*Attorney, Agent, or Firm*—Richard D. Schmidt; Thomas Savoie; Daniel J. Donovan

[57] ABSTRACT

Fibrous proteinaceous material useful in the formation of shrimp or crabmeat analog products is prepared by extruding an aqueous solution containing both protein and alginate into a gelling bath wherein the extrudate is subject to boiling conditions in the gelling bath.

25 Claims, No Drawings

EXTRUSION PROCESS FOR SHRIMP OR CRABMEAT ANALOG PRODUCTS USING BOILING GELLING BATH

BACKGROUND OF THE INVENTION

1. Field of the Invention

This invention relates to a process for preparing extruded fibrous shrimp or crabmeat analog products from solutions containing both protein and alginate.

2. Description of the Prior Art

Protein-alginate fibers have been produced from solutions containing both protein, such as soy protein, and alginate salts, as disclosed, for example, in U.S. Pat. Nos. 3,093,483, 3,627,536 and 3,829,587. In the processes disclosed in these references, however, the extrudate is processed, in such a way, through a single gelling bath and under such conditions of temperature and/or pH control, as to produce shrimp or crabmeat analog products that do not have as good a combination of the textural, juiciness and chewiness characteristics of natural crabmeat or shrimp as is desired.

Thus, prior to the present invention, it has not been readily possible to produce extruded fibrous shrimp or crabmeat analog products from extrudable solutions of protein and alginate which have an acceptable combination of texture, juiciness and chewiness which approximates that of natural shrimp or crabmeat.

SUMMARY OF THE PRESENT INVENTION

An object of the present invention is to provide an extrusion process wherein extrudable solutions of protein and alginate may be readily extruded into fibrous shrimp analog products having textural, juiciness and chewiness characteristics approximating those of natural shrimp or crabmeat.

These and other objects of the present invention are achieved by extruding an aqueous solution of protein and alginate into a polyvalent cation gelling bath wherein the extrudate is subjected to boiling conditions in the gelling bath. The fibrous extrudate is then bound by an alginate solution which is set by polyvalent cation diffusion from the fibers.

DESCRIPTION OF THE PREFERRED EMBODIMENTS

The extrudable solution compositions of the present invention contain the following components:

| Component of Extrudable Composition | Weight % Broad | Range of Component Preferred |
|---|---|---|
| Water | 75 to 97.5 | 92.5 to 95.0 |
| Protein | 2 to 20 | 4 to 6 |
| Alginate | 0.5 to 5 | 0.5 to 1.5 |

The protein and alginate are used in a weight ratio, with respect to each other, of about 1:1 to 10:1. The weight percent of protein of the composition forming the shrimp or crabmeat analog is in the range from about 20% to about 30%.

These solutions have a natural pH in the range of 5 to 8 and a viscosity of about 200 to 5000 cps, at 25° C. When extruded into the gelling bath, the solution itself is at a temperature in the range of about 0° to 50° C.

The protein which may be used in these compositions may be of the heat coagulable as well as the heat non-coagulable types. The heat coagulable types of protein would include vegetable protein such as soy protein isolate, and soy protein concentrate, as well as egg albumin and lactalbumin.

The heat non-coagulable types of protein would include caseinates such as sodium, potassium, and ammonium caseinates.

The useful proteins are those which would have a poor degree of solubility in the boiling gelling bath, i.e., a solubility of less than about 10, and preferably less than about 5, weight %.

Thus, proteins which would be highly soluble under the gelling conditions being used such as gelatin and protein hydrolysates would not be used in the process of the present invention.

The proteins should also not have too high a concentration of the polyvalent cations used in the gelling agent solution, i.e., a concentration that would lead to gelation of alginates, prior to the fiber forming step in the process, i.e., during the preparation or handling of the extrudable solution. When such cation containing proteins are to be used, they must be pretreated with a cation exchange resin prior to the addition of the alginate thereto.

The useful soluble alginates would include the sodium, potassium and ammonium salts thereof. Alginates having a high molecular weight, as evidenced by a viscosity of about 500 to 1000 cps (as a one weight % aqueous solution) are preferred. The use of the high molecular weight alginates allows one to obtain a desired texture in the analog product at a relatively low level of alginate content.

The gelling agents used in the gelling baths employed in the process of the present invention would inlude inorganic and organic salts of polyvalent cations which cause gellation of the soluble alginates. These gelling agents would include salts of $Ca^{++}$, $Al^{+++}$ and $Fe^{+++}$, such as calcium chloride, calcium sulfate, calcium acetate, calcium gluconate, calcium lactate, aluminum chloride and ferric chloride.

The gelling agents should not be used in such amounts as would impart a bitter taste to the end product, although excess gelling agent can be washed out of the set fibers to avoid this problem.

Spinning Conditions

The protein-alginate solutions of the present invention may be extruded into the gelling baths by means of any of the conventionally employed extrusion shaping devices employed in the art of making edible fibers such as spinnerettes and nozzles.

These extrusion devices are designed to produce fibers that are about 0.1 to 10, and preferably of about 1 to 5, millimeters in diameter. Where the fibers are less than 1 mm in diameter, they tend to have a solid cross-section. When they have a larger diameter they tend to have a hollow cross-section when gellation occurs in the boiling gellation bath of the present invention.

Crabmeat analog products are preferably prepared from solid fibers having a diameter of about 0.5 to 1 mm and the shrimp analog products are preferably prepared from hollow fibers having a diameter of about 5 to 7 mm.

Use of Boiling Gelling Bath

The preferred gelling agent to be used in the boiling bath is calcium chloride at a 0.5 to 1 weight % level or calcium gluconate at a 5 to 7% weight level. These boiling gelling baths have a pH of about 5 to 8, and preferably of about 6 to 7.

The solids concentration of the protein-alginate solution extruded into the boiling gelling bath should be of a relatively dilute nature, i.e., it should contain about 0.5 to 5 weight % alginate, about 2 to 20 weight % protein and have a total solids content of about 2.5 to 25%. The ratio of protein to alginate in such solution should preferably be about 1:1 to 10:1.

The residence time of the fiber in the boiling gelling bath is controlled by the rate of gelling agent cation diffusion. Thus, at a higher cation concentration, the reaction time can be shorter. The diameter of the fiber is also a factor. Where the gelling agent is calcium gluconate at a 5 to 7 weight % level, and the boiling is conducted at 100° C. at atmospheric pressure, 20 minutes residence time is adequate for fiber that is 5 mm in diamter, and 5 minutes residence time is adequate for fiber that is 1 mm in diameter.

It is to be noted that the boiling conditions of the boiling gelling bath need not be maintained at atmospheric pressure, i.e., at temperatures of about 100° C. Fibers having texture resembling shrimp and crabmeat can be obtained by allowing this gelling bath to attain boiling conditions at lower tempertures, of down to 60° C., by lowering the pressure on the bath.

Molding of Shrimp or Crabmeat Analog

After being fully treated in the boiling gelling bath any excess moisture in the fiber, in the form of the extrusion solution or the gelling bath solution, is removed therefrom, as by compression of the fibrous mass. The desired moisture content for the product at this point should be about 65 to 80, and preferably about 70 to 75 weight % for shrimp and crabmeat analog products.

The continuous fiber may then be cut into smaller segments of about 3 to 5 centimeters.

To prepare a molded analog product the fibers are mixed with a binder solution containing about 1 to 5, and preferaby of about 2 to 3, weight % of an alginate and placed in a mold. The fibers are added to the binder solution in a weight ratio of the wet fibers (containing about 70 to 75 weight % moisture) to liquid binder solution of about 5 to 0.5:1 and preferably of about 2±0.5:1. The mold employed has the shape of the desired product, i.e., shrimp or crabmeat shaped.

The mixture of the fiber and binder solution is retained in the mold at room temperature, 25°±5° C., for a period of time sufficient to permit residual polyvalent cation from the gelling agent solution which is still in the fiber to diffuse into the surrounding binder solution and cause gellation of the binder. For this purpose, the residual calcium ion concentration in the fiber should be about 0.1 to 0.4 weight %.

The time required for this gellation of the fiber/binder system to occur may be about 10 to 20 minutes depending on the ratio of fiber to binder, and the cation concentration in the fiber. The resulting gelled product can be considered a mass of fibers bound together by the gelled alginate in molded or loaf form.

The thus prepared analog product can be used as is, or frozen for future use. It need not be cooked prior to being eaten. For the production of an analog product in the form of loose crabmeat, the above described step is not needed and thin fibers of about 1 to 2 millimeters in diameter, and about 1 to 5 centimeters in length, can be used, unbound, for this purpose.

The following examples are merely illustrative of the present invention and are not intended as a limitation upon the scope thereof.

EXAMPLE 1

An extrudable aqueous solution was prepared by dissolving 25 grams of sodium caseinate and 6.25 grams of sodium alginate in 470 cc of water in a Hobart mixer at Speed No. 2. This solution, at room temperature, was then extruded through a nozzle opening of 5 to 7 mm diameter into a 7% by weight aqueous solution of calcium gluconate which had a pH of 6 to 7 and which was maintained at boiling conditions, about 100° C., at atmospheric pressure. The fibrous extrudate was held in the boiling bath for 20 minutes. The extrudate was a continuous fiber which was recovered from the boiling bath and compressed by being passed through a set of small rollers to squeeze excess water from the fiber. The compressed fiber then had a solids content of about 25 to 30 weight % and a retained moisture content of about 70 to 75 weight %. The continuous fiber was then cut into 2" lengths and mixed with a 3% by weight aqueous solution of sodium alginate. The weight ratio of wet fiber to alginate solution was about 2:1. The alginate solution was at a temperature of 25° C. The resulting mixture was then placed in a shrimp mold where calcium ion was allowed to diffuse from the caseinate-alginate fiber to the alginate binding solution. The alginate solution gelled in about 20 minutes due to the interaction of the calcium ions therewith. The gelled alginate thus functions as a binding agent for the caseinate-alginate fibers. The thus shaped shrimp analog product was then taken out of its mold and stored at −20° C. After being frozen for 10 days, the shrimp analog product was thawed out by heating at 50° C. The alginate binder was found to be like the connective membrane of natural shrimp in both appearance and texture. This analog product thus consisted of two distinct components, a chewy and juicy fiber bound together with a tough membrane and the total product closely resembled natural shrimp with respect to its eating qualities.

EXAMPLE 2

The same process as that employed in Example 1 was employed herein except that, when the solution of sodium caseinate and sodium alginate was initially extruded into the calcium gluconate bath, the temperature of the bath was at 60° C., at atmospheric pressure. After the extruded continuous caseinate-alginate fibers were in the calcium gluconate bath for 5 minutes, during which a stable surface film was created on the fiber, the pressure above the bath was reduced to about 150 mm Hg at which point the bath began to boil. The fiber was then retained in the boiling bath for 20 minutes longer. The resulting fiber product was bound and frozen-stored as described in Example 1 to produce analogs of shrimp. The shrimp analog products had the same good qualities as those of the analog products made in Example 1.

EXAMPLE 3

The same process as that employed in Example 1 was employed herein except that the extrudable aqueous solution was formed from 5 weight % of egg albumin and 1 weight % of sodium alginate, and the calcium salt aqueous boiling bath was a 1% by weight solution of calcium chloride. The resulting fiber also had the good qualities of the fiber products of Example 1. This fiber, when bound and frozen-stored as described above in Example 1, had a shrimp like texture.

EXAMPLE 4

An extrudable solution was prepared by first treating liquid skim cows milk containing 3.5 weight % protein, in the form of casein and lactalbumin, with a cation exchange resin to remove substantially all the calcium ion therefrom. This calcium free milk solution (500 grams) was then mixed with 3.5 grams of sodium alginate and blended in a bench top Hobart mixer for 60 minutes at Speed No. 2 to produce a uniform solution. This solution was then processed as in Example 1 above except that a 5% by weight solution of calcium gluconate and a 1 mm wide extrusion nozzle was used, and the extruded fiber was only kept in the boiling bath for 5 minutes. The resulting thin fiber had a texture close to that of natural loose crabmeat.

EXAMPLE 5

Fibers having a good crabmeat like texture were formed as in Example 4 above employing, as the extrudable solution, an aqueous solution of 5 weight % of soy protein isolate and 1 weight % of sodium alginate, and the boiling calcium ion bath contained 0.5 weight % of calcium chloride.

EXAMPLE 6

An extrudable aqueous solution was prepared by dissolving 20 grams of sodium caseinate and 5 grams of sodium alginate in 500 cc of water. This solution, at room temperature was then extruded through a nozzle opening of 4 mm diameter into a 5% by weight aqueous solution of calcium gluconate which had a pH of 6.5 and which was maintained under boiling conditions. The extruded fibrous product which formed in the bath was collected after 10 minutes of reaction time in the boiling bath and compressed to remove excess water therefrom and to reduce its water content to about 70 weight %. The continuous fiber product was then cut into 5 cm long lengths and mixed with a 3% by weight aqueous solution of sodium alginate. The weight ratio of wet fiber to alginate solution was 2:1. The solution was at a temperature of 30° C. The resulting mixture was then placed in shrimp molds and allowed to stand for 20 minutes at 25° C. to allow for gellation of the alginate as a result of diffusion of calcium ions from the wet fibers to the alginate solution. The resulting shrimp analog product was then removed from the mold and kept frozen for 1 week at −10° C. The thus stored shrimp analog product when thawed out by heating at 50° C. gave a pleasant mouthfeel close to that of natural shrimp. This mouthfeel quality of the shrimp analog products of the present invention was significantly better than comparable products made as otherwise disclosed above except for their being extruded into a single gelling bath held under non-boiling conditions, i.e., at a temperature of 25° C. at atmospheric pressure, rather than under boiling conditions.

What is claimed is:

1. In a process for the formation of a fibrous material useful in the formation of a shrimp or crabmeat analog therefrom which is subject to freeze-thaw cycling by extruding an aqueous solution of protein and alginate into a gelling bath, the improvement which comprises maintaining said bath under boiling conditions during the formation of said fibers in said bath.

2. A process as in claim 1 in which said solution of protein and alginate comprises about 2 to 10 weight % of protein and about 0.5 to 3.0 weight % of alginate.

3. A process as in claim 1 in which said protein is selected from that class of proteins and protein derivatives which has a solubility of less than about 5% in said gelling bath under said gelling conditions.

4. A process as in claim 3 in which said protein, prior to contact with said alginate, is pretreated to remove excess polyvalent cation therefrom.

5. A process as in claim 1 in which said protein is a heat coagulable protein or a non-heat coagulable protein.

6. A process as in claim 5 in which said protein is a heat coagulable protein.

7. A process as in claim 6 in which said protein is selected from the group consisting of egg albumin, lactalbumin, soy protein isolate and soy protein concentrate.

8. A process as in claim 5 in which said protein is a non-heat coagulable protein.

9. A process as in claim 8 in which said protein is selected from the group consisting of sodium caseinate, potassium caseinate and ammonium caseinate.

10. A process as in claim 4 in which said alginate is selected from the group consisting of sodium alginate, potassium alginate and ammonium alginate.

11. A process as in claim 1 in which said gelling bath is an aqueous solution comprising about 0.1 to 1 weight percent, based on the cation content, of at least one compound of at least one cation selected from the group consisting of $Ca^{+2}$, $Al^{+3}$ and $Fe^{+3}$.

12. A process as in claim 11 in which said cation is calcium.

13. A process as in claim 11 in which said compound is selected from the group consisting of calcium acetate, calcium lactate, calcium gluconate, calcium sulfate, calcium chloride, aluminum chloride and ferric chloride.

14. A process as in claim 1 in which said solution of protein and alginate, at 0° to 50° C., is extruded into said gelling bath.

15. A process as in claim 1 in which the extrudate is maintained under boiling conditions for about 5 to 20 minutes.

16. A process as in claim 15 in which an extrudate is produced in the form of hollow fibers having a diameter of about 5 to 7 millimeters.

17. A process as in claim 15 in which an extrudate is produced in the form of solid fibers having a diameter of about 0.5 to 1 millimeter.

18. A process as in claim 1 in which said aqueous solution comprises, in weight percent:
75 to 97.5% water;
2 to 20% protein; and
0.5 to 5% alginate.

19. A process as in claim 18 in which said protein and said alginate are employed in a weight ratio to each other of about 1:1 to 10:1.

20. A process as in claim 1 further comprising the steps of recovering the gelled fibers, removing excess water therefrom, cutting the fibers into suitable lengths, binding the cut fibers with an alginate solution in a shrimp or crab meat shaped mold.

21. A process as in claim 17 further comprising the steps of freezing the molded shaped product for a period of time sufficient to form a tough outer film thereon resembling the connective membrane of shrimp.

22. A shrimp or crabmeat analog formed from fibers of a protein and alginate composition extruded into a gelling bath maintained under boiling conditions wherein said fibers are hollow and about 5 to 7 millimeters in diameter.

23. A shrimp or crabmeat analog as in claim 22 wherein said composition comprises at least 20 weight % protein.

24. A shrimp or crabmeat analog as in claim 23 wherein said composition comprises about 20 to 30 weight % protein.

25. A shrimp or crabmeat analog as in claim 24 wherein said protein is selected from that class of proteins and protein derivatives which has a solubility of less than about 10% in boiling aqueous calcium solution.

* * * * *